United States Patent
Mitchell

(10) Patent No.: US 9,111,315 B2
(45) Date of Patent: Aug. 18, 2015

(54) METHOD FOR PROVIDING A SEARCHABLE, COMPREHENSIVE DATABASE OF PROPOSED RIDES

(76) Inventor: Clyde Mitchell, New York, NY (US)

( * ) Notice: Subject to any disclaimer, the term of this patent is extended or adjusted under 35 U.S.C. 154(b) by 845 days.

(21) Appl. No.: 11/893,085

(22) Filed: Aug. 13, 2007

(65) Prior Publication Data

US 2009/0049044 A1 Feb. 19, 2009
US 2013/0006959 A9 Jan. 3, 2013

Related U.S. Application Data

(63) Continuation of application No. PCT/US2006/004374, filed on Feb. 7, 2006.

(60) Provisional application No. 60/653,374, filed on Feb. 16, 2005.

(51) Int. Cl.
*G06F 7/00* (2006.01)
*G06F 17/30* (2006.01)
*G06Q 30/08* (2012.01)

(52) U.S. Cl.
CPC .................................. *G06Q 30/08* (2013.01)

(58) Field of Classification Search
CPC .............................................. G06F 17/30867
USPC ............. 707/6, 723, 732, 733, 748, 769, 770, 707/783, 784
See application file for complete search history.

(56) References Cited

U.S. PATENT DOCUMENTS

| | | | |
|---|---|---|---|
| 4,360,875 A * | 11/1982 | Behnke | 455/456.5 |
| 6,356,838 B1 | 3/2002 | Paul | |
| 6,584,401 B2 | 6/2003 | Kirshenbaum et al. | |
| 6,675,150 B1 | 1/2004 | Camer | |
| 7,080,019 B1 * | 7/2006 | Hurzeler | 705/6 |
| 7,085,806 B1 * | 8/2006 | Shapira | 709/203 |
| 7,629,891 B1 * | 12/2009 | Bell | 340/573.1 |
| 2001/0037174 A1 * | 11/2001 | Dickerson | 701/200 |
| 2001/0056363 A1 * | 12/2001 | Gantz et al. | 705/9 |
| 2003/0120522 A1 | 6/2003 | Uyeki | |
| 2003/0182263 A1 * | 9/2003 | Augustine et al. | 707/1 |
| 2004/0049424 A1 * | 3/2004 | Murray et al. | 705/14 |
| 2004/0158483 A1 | 8/2004 | Lecouturier | |

(Continued)

OTHER PUBLICATIONS

"RideCheck Offers Summer Ridesharing Across the USA and Canada!", Business Wire , p. NA, Jul. 25, 2005.*

*Primary Examiner* — Mark H Hershley
(74) *Attorney, Agent, or Firm* — Russ Weinzimmer & Associates, P.C.

(57) ABSTRACT

A method is disclosed that matches travelers for ride sharing according to personal preferences, such as smoking, music, allergies, drive sharing, expense sharing, number of riders, and gender, as well as basic trip details. In preferred embodiments the method is accessed via a website, and trips can be over any distance and/or by any land, air, or water vehicle. Embodiments require traveler verification by a payment and/ or other means, and/or require travelers to supply identifying information. Matches can take into account ratings of travelers by other travelers. Confirmations, reminders, and ride sharing advice can be sent to riders before scheduled rides, and information about a shared ride can be sent to a non-rider. Fees can be charged, and credited if no match is accepted. Communications can be secure and requesting and/or accepting matches can be logged. Origin and/or destination radii can be automatically enlarged to provide more matches.

24 Claims, 13 Drawing Sheets

(56) References Cited

U.S. PATENT DOCUMENTS

| | | | |
|---|---|---|---|
| 2005/0049781 A1* | 3/2005 | Oesterling | 701/207 |
| 2005/0159999 A1* | 7/2005 | Totten et al. | 705/14 |
| 2006/0155460 A1* | 7/2006 | Raney | 701/207 |
| 2006/0276960 A1* | 12/2006 | Adamczyk et al. | 701/201 |
| 2006/0293937 A1* | 12/2006 | Sohm et al. | 705/8 |
| 2007/0198276 A1* | 8/2007 | Hinrichs et al. | 705/1 |
| 2008/0010598 A1* | 1/2008 | Smilowitz et al. | 715/745 |
| 2008/0014908 A1* | 1/2008 | Vasant | 455/414.1 |
| 2008/0021723 A1* | 1/2008 | Devarakonda | 705/1 |
| 2008/0270204 A1* | 10/2008 | Poykko et al. | 705/7 |
| 2008/0277183 A1* | 11/2008 | Huang et al. | 180/271 |
| 2009/0049044 A1* | 2/2009 | Mitchell | 707/6 |

\* cited by examiner

Personal Info: — 200

| First Name: | Last Name: | Town/City: | |
|---|---|---|---|
| Clyde | Rideposter | New York | ← 202 |

| Street Address: | State: | Zip Code: |
|---|---|---|
| 171 East 90th St., 4B | NY | 10128 | xxxxx

| Driver's License: | State of Issue: |
|---|---|
| AAA11111A | NY |

| Primary Telephone: |
|---|
| 2127229257 |

| Secondary Telephone: | Date of Birth: | | | Year |
|---|---|---|---|---|
| 2127229258 | 1 | 1 | | 1900 |

Gender: ● Male ○ Female

Click here to check mandatory age limits on rides starting in some states

School Info: — 204

NOTE TO STUDENTS: For your security please enter your school information

| School Name: | Campus Name: | Student id: ← 206 |
|---|---|---|
| MIT | East Campus | A11111111A |

Security Info: — 208

IMPORTANT: You MUST enter a valid email address that you can check immediately.

STUDENTS: Your school's email address is strongly preferred for security

| Create Your User ID: | Email Address: | Re-enter Email Address: ← 210 |
|---|---|---|
| ClydePoster | clydemitchell@alum.mit.edu | clydemitchell@alum.mit.edu |

7 character minimum for User Id: e.g., jeff950 (Don't use
Please enter a valid license number(minimum 9 characters)

Password Info:

Create your new password*  
••••••

Re-enter your new password*  
••••••

Select secret question*  
My Favorite Color

Enter answer to your secret question*  
blue

Vehicle Info:

Vehicle Type

● Automobile
○ Mini-Van
○ Truck
○ Motorcycle
○ Water Craft
○ Aircraft
○ Other

Vehicle Make: Ford
Model: Taurus
License Plate: AAA1111
Color: Silver
Condition: good
State Registered: NY
Year: 1998

FIG 3A

Leaving On: 02-28-2008   MM-DD-YYYY   ☐ 300

☑ Morning  ☐ Afternoon  ☐ After 6PM   ☐ Post Return Ride ← 308

Ride Offer:
◉ I have a vehicle and need passenger(s)

I have room for [3] passenger(s). ← 302

Note: You are commited to go on the ride of one rider accepts the ride. Sorry.

| Leaving From: | | Going To: | |
|---|---|---|---|
| Zip Code: 10004 | | Zip Code: 90401 ← 304 | |
| -OR- | | -OR- | |
| Town / City: | | Town / City: | |
| State: ▼ | | State: ▼ | |
| Neighborhood Bowling Green (Optional) | | Neighborhood Pier (Optional) | |

Ride Expenses:  The customary expense sharing agreement is to share the cost of fuel and tolls arising from the actual trip. If you use half a tank of gas, that cost should be shared (not the cost of a full tank). All riders should share these costs equally. For more information, click here: Other Costs You can change this agreement in the following box, but please be clear (or nobody may accept your ride)

```
Riders with me must pay depreciation - 20 cents per mile.  They can share that charge
pro-rata.
```
← 306

Driving Terms:

○ I will be the only driver because it is my vehicle

◉ I will share the driving ← 312

○ I will not drive, even though it is my vehicle

License Registration: ← 310

I am a licensed driver: ◉ Yes

If 'Yes' License Number: [AAA11111A]

Expiration Date: [02/30/2008]    State Issued: [NY ▼]
MM-DD-YYYY

☑ Save on File

Smoking Terms: ← 314

◉ I do not smoke, and I will ride with non-smokers only

○ I plan to smoke

○ I do not smoke, but will ride with smokers who agree to smoke outside the vehicle

Gender of Riders: ← 316

◉ I will travel with riders of either gender

○ I will only travel with women because I am a woman

○ I will only travel with men because I am a man

FIG 3B

Other Ride Preferences: Optional - use sparingly.
List all other rules that you want to set. If you are too picky, you may not get a rider.
Good Example: I will need to pick up at the corner of Maple St and Fifth Avenue, in Brookdale. I am allergic to pets and can't be in the same car with them. I dislike music while driving.
Bad Example: I need to ride with nice people and our pets need to get along. (It's too open-ended.)

318

Leaving from Bowling Green and dropping off at the Pier. No pets. Only rock will be played. Otherwise, bring headsets.

Vehicle Details: You must provide correct and accurate information to ensure identification and rider security. If your ride is declined based on incorrect information, you will not receive any credit and it will result in bad rating(s). The vehicle must be insured and registered. No commercial vehicles or motorcycles are permitted.

| Vehicle Make: | Ford |
| Model | Taurus |
| License Plate | AAA1111 |

Year: 1966   Color: Silver
Condition: good
State: NY

← 320

○ The vehicle is registered in my name
◉ The vehicle is registered in this person's name: Mamma Rideposter
☑ Save this vehicle information for future reference

FIG 3C

Trips from within 50 miles of New York to within 50 miles of Los Angeles

| Source | Destination | Ride Date | Gender | Ride Details | Accept Ride |
|---|---|---|---|---|---|
| New York,NY | Beverly Hills,CA | 02-08-2005 | Male/Female | Details | Accept |
| New York,NY | Santa Monica,CA | 02-08-2005 | Male/Female | Details | Accept |
| Brooklyn,NY | Venice,CA | 02-16-2005 | Male/Female | Details | Accept |
| Brooklyn,NY | Venice,CA | 02-18-2005 | Male/Female | Details | Accept |
| | | | | | |

Ratings for my Posted Rides

| Source | Destination | Ride Date | Ride Details | Rate Riders |
|---|---|---|---|---|
| New York, NY | Beverly Hills, CA | 03-05-2005 | Details | Future Ride |
| New York, NY | Beverly Hills, CA | 02-24-2005 | Details | Future Ride |
| New York, NY | Beverly Hills, CA | 01-31-2005 | Details | Rate Riders |

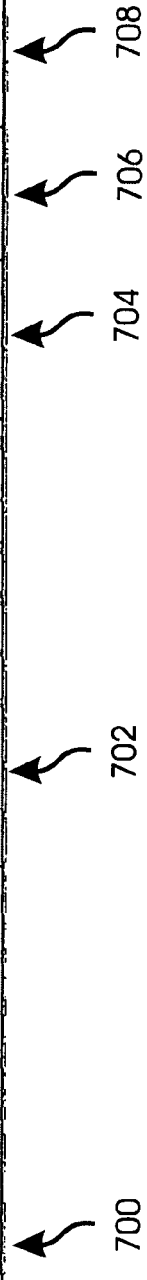

Ratings for my Accepted Rides

| Source | Destination | Ride Date | Ride Details | Rate Riders |
|---|---|---|---|---|
| New York, NY | Beverly Hills, CA | 03-05-2005 | Details | Future Ride |
| New York, NY | Pacoima, CA | 03-30-2005 | Details | Future Ride |
| New York, NY | Los Angeles, CA | 02-26-2005 | Details | Future Ride |
| New York, NY | Beverly Hills, CA | 01-31-2005 | Details | Rate Riders |

700 → 702 → 704 → 706 → 708

METHOD FOR PROVIDING A SEARCHABLE, COMPREHENSIVE DATABASE OF PROPOSED RIDES

CROSS-REFERENCES TO RELATED APPLICATIONS

This Application is a continuation of International Application No. PCT/US2006/004374, filed Feb. 7, 2006, the title of which is "METHOD FOR PROVIDING A COMPREHENSIVE, SEARCHABLE DATABASE OF PROPOSED TRIPS," and which is incorporated herein in it's entirety by this reference, and which claimed the benefit of and was subsequently granted priority from, US. Provisional Application Ser. No. 60/653,374 filed Feb. 16, 2005, the title of which is "METHOD FOR PROVIDING A COMPREHENSIVE, SEARCHABLE DATABASE OF PROPOSED TRIPS," and which is also incorporated herein in it's entirety by this reference.

FIELD OF THE INVENTION

The invention generally relates to ride sharing, and more specifically to methods of arranging for sharing of rides.

BACKGROUND OF THE INVENTION

Services and methods are known that match travelers who wish to make similar trips, so as to take advantage of the economic and environmental benefits of ride sharing. However, these services typically do not take into consideration the riders' personal traveling preferences. For example, they do not allow a rider to specify a gender, smoking preferences, music preferences, or to specify different departure times. This leads to unpredictable and sometimes unpleasant ride sharing experiences, especially when the methods are applied to individual trips as compared to regular, frequently repeated, short trips such as commuting to work and back.

In addition, known systems and methods for matching travelers are typically restricted to matching automotive travelers who commute within a local region. They are typically focused on "commuting areas" around cities and are therefore best suited for car pooling and local commuting. This does not benefit travelers who wish to take trips spanning a particular region, country or continent, and who may wish to share modes of transportation other than automobiles.

SUMMARY OF THE INVENTION

A method is claimed for identifying ride sharing matches according to personal ride sharing preferences as well as basic ride requirements, so as to ensure a more positive ride sharing experience. Preferred embodiments of the method also allow for travel over any distance, using any desired type of vehicle.

The method includes establishing a database on a server, the database being capable of containing ride requirements and personal ride sharing preferences, providing to travelers access to the database, the access being provided in preferred embodiments through a website, and accepting from travelers ride requirements and personal ride sharing preferences. In preferred embodiments, the personal ride sharing preferences can include expense sharing preferences, gender preferences, departure time preferences, pick up location preferences, drop off location preferences, music preferences, allergy avoidance preferences, preferences for accommodating disabilities, pet related preferences, and preferences for accommodating special needs.

The method further includes identifying a ride sharing match based on the ride requirements and personal ride sharing preferences of travelers included in the ride sharing match, and providing to all travelers included in the ride sharing match access to information regarding the ride sharing match.

In preferred embodiments the method also includes verifying the identity of a traveler before accepting ride requirements and personal ride sharing preferences from the traveler and/or before identifying ride sharing matches that include the traveler. In some of these preferred embodiments, verifying the identity of the traveler includes accepting from the traveler a user ID and a password provided by the traveler using a computer, a wireless access device, or some other communication device. In other of these preferred embodiments verifying the identity of the traveler includes receiving a payment so as to establish the credibility of the traveler, or at least of someone associated with the traveler who is willing and able to make payments.

In some preferred embodiments, the method includes obtaining information from a traveler that can be used by other travelers to verify the identity of the traveler before accepting ride requirements and personal ride sharing preferences from the traveler, and/or before identifying ride sharing matches that include the traveler. And in some of these embodiments the identifying information includes at least one of: personal information, including an address, a telephone number, an email address, a date of birth, a gender, a driver's license number, a driver's license state of issue, and/or other personal information; vehicle information, including a vehicle make, a vehicle model, a vehicle year of manufacture, a vehicle license plate number, a vehicle registration, a vehicle owner name, a vehicle color, a description of vehicle condition, and/or other vehicle information; and student information, including a student ID number, a name of a college attended by the traveler, a name of a college campus attended by the traveler, and/or other student information.

In certain preferred embodiments the method includes accepting from travelers rating information pertaining to other travelers based on ride sharing experiences. In some of these preferred embodiments rating information is provided to travelers pertaining to other travelers with whom they share a ride sharing match, rating information is taken into account when identifying ride sharing matches, and/or preferences regarding acceptable rating information is considered when matching travelers for ride sharing.

in preferred embodiments, ride requirements and personal ride sharing preferences accepted from a traveler can include the capacity of a vehicle to accommodate a plurality of riders and/or preferences regarding sharing a ride with a plurality of other travelers. And in some preferred embodiments ride requirements and personal ride sharing preferences accepted from a traveler can include ride requirements and personal ride sharing preferences for a first ride from an origin to a destination and ride requirements and personal ride sharing preferences for a second ride from the destination back to the origin.

In certain preferred embodiments, when a ride sharing match is accepted by at least two travelers, confirmation is sent to all travelers who have accepted the ride sharing match, suggestions regarding practical issues of ride sharing are sent to all travelers who have accepted the ride sharing match, and information is sent regarding the ride sharing match to someone not included in the ride sharing match upon request of a traveler who has accepted the ride sharing match. And in some preferred embodiments reminders are sent to travelers who have accepted a ride sharing match a day before, a week before, and/or at other specified intervals of time before the agreed upon date and time for the shared ride.

In preferred embodiments, ride requirements and personal ride sharing preferences accepted from a traveler are compared at specified time intervals with ride requirements and personal ride sharing preferences accepted from other travelers, so as to identify ride sharing matches.

In certain preferred embodiments at least some of the communications between travelers and the database and between travelers and other travelers are secure communications. And in some preferred embodiments a record is maintained of ride requirements and personal ride sharing preferences accepted from travelers, of identified ride sharing matches including travelers, and/or of ride sharing matches accepted by travelers.

In preferred embodiments ride requirements and personal ride sharing preferences accepted from travelers can be for rides that use any type of vehicle, including a ground vehicle, an aircraft, and/or a water vessel, and for rides that cover any desired distance.

In some preferred embodiments, radii are calculated about specified departure and/or destination points, and a search is made for compatible ride sharing information with departure and destination points within those radii. And in some of these embodiments one or both of the calculated radii are automatically enlarged until a specified minimum number of ride sharing matches is identified.

In certain preferred embodiments a notifying message is sent to a traveler from whom ride requirements and personal ride sharing preferences have been accepted whenever potentially compatible information is subsequently accepted from another traveler.

In some preferred embodiments travelers are required to pay a fee so as to use the method, and in some of these embodiments at least part of the fee is credited back to the traveler if his or her use of the method does not result in acceptance of a minimum number of ride sharing matches.

And in preferred embodiments, ride requirements and personal ride sharing preferences accepted from a traveler can be changed at any time before a ride sharing match based on the ride requirements and personal ride sharing preferences is accepted by the traveler and by at least one other traveler.

BRIEF DESCRIPTION OF THE DRAWINGS

FIG. 2A presents the first of two preferred embodiment website screens that are used by a traveler to register with the website and to supply identifying and other personal information;

FIG. 2B presents the second of two preferred embodiment website screens that are used by a traveler to register with the website and to supply identifying and other personal information;

FIG. 3A presents the first of a series of three website screens from a preferred embodiment that are used by a traveler to provide information regarding a trip being posted by the traveler;

FIG. 3B presents the second of a series of three website screens from a preferred embodiment that are used by a traveler to provide information regarding a trip being posted by the traveler;

FIG. 3C presents the third of a series of three website screens from a preferred embodiment that are used by a traveler to provide information regarding a trip being posted by the traveler;

FIG. 4 presents a preferred embodiment website screen that is used by a traveler to provide information regarding a trip that the traveler wishes to make by riding in someone else's vehicle;

FIG. 5 presents an example of a report of possible ride sharing matches presented to a traveler by a preferred embodiment;

FIG. 7A presents a preferred embodiment website screen that can be used by a traveler to rate other riders who previously shared rides posted by the traveler;

FIG. 7B presents a preferred embodiment website screen that can be used by a traveler to rate other riders with whom the traveler shared rides that were not posted by the traveler;

DETAILED DESCRIPTION OF PREFERRED EMBODIMENTS

Figure 1:
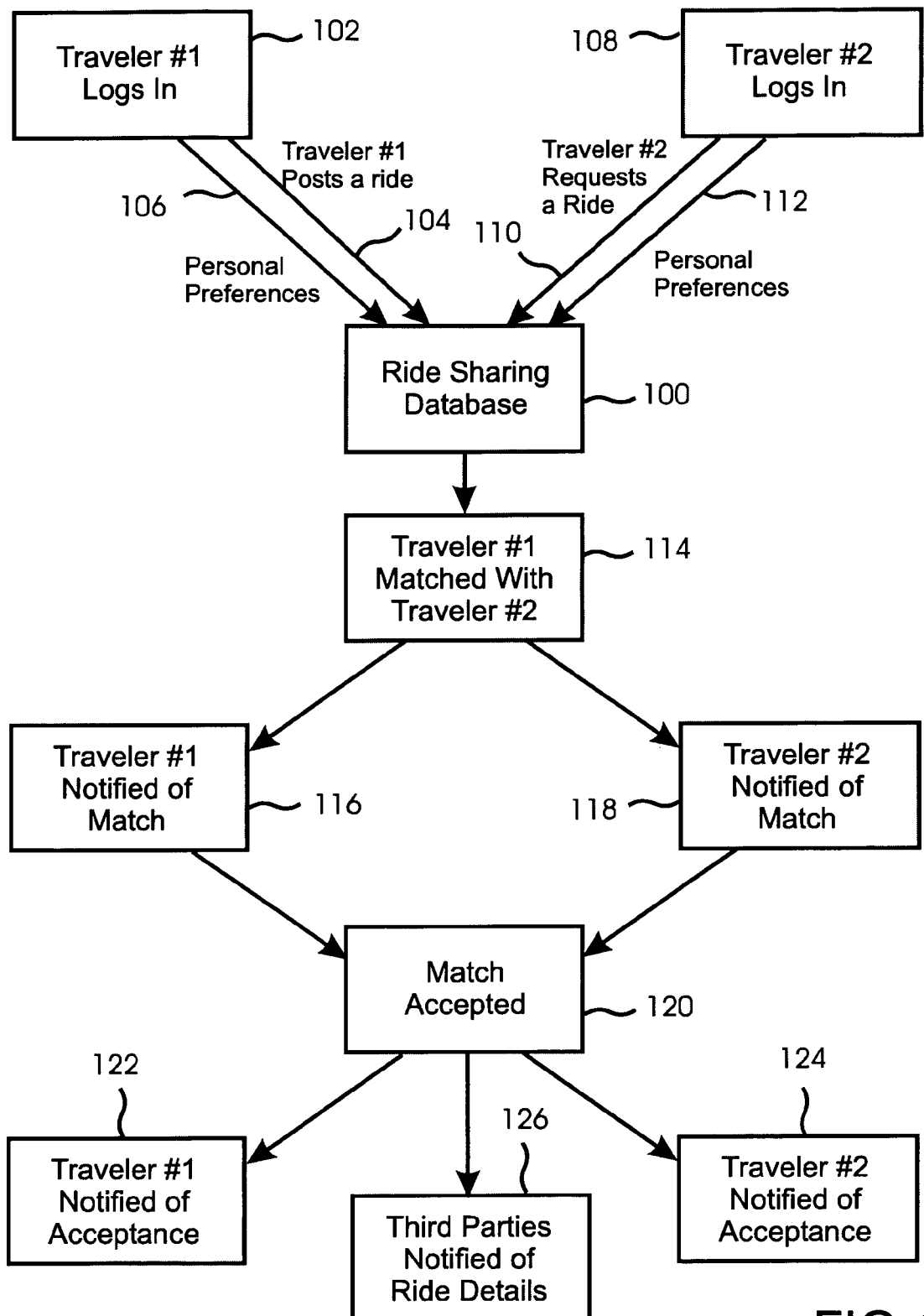
FIG. 1 is a functional diagram that illustrates the method of the present invention.

FIG. 1 illustrates a typical application of the method of the present invention. A database 100 is provided on a server, the database being able to contain information about travelers wishing to share rides. In the embodiment of FIG. 1, the database 100 is made available on an internet website. A first traveler 102 is planning a trip using his or her vehicle, and wants to be matched with at least one other traveler wishing to make a similar trip and interested in sharing the ride. The first traveler, who has previously registered with the website and has previously supplied identifying and other personal information, logs onto the database 102, using a computer, a web-enabled wireless device, or any other web-enabled device, and "posts" the ride 104. Together with information about the planned trip, the first traveler also provides information 106 regarding his or her personal preferences relating to the trip, such as expense sharing preferences, gender preferences, departure time preferences, pick up location preferences, drop off location preferences, music preferences, allergy avoidance preferences, preferences for accommodating disabilities, pet related preferences, and preferences for accommodating special needs.

A second traveler 108 wishes to make a similar trip, but prefers to share a ride in someone else's vehicle rather than using his or her own vehicle. The second traveler 108, who has also previously registered with the website and has also previously supplied identifying and other personal information, logs onto the database 100, and requests a ride 110. The second traveler provides information about the trip that he or she wishes to make, and also provides information 112 regarding his or her personal preferences relating to the trip.

Upon searching the database 100 for matches between travelers who have provided compatible ride sharing information, including compatible personal preferences, the server identifies a match 114 between the first traveler 102 and the second traveler 108. The first traveler 102 and the second traveler 108 are then notified 116, 118 that their ride sharing information has been matched, details are provided to each regarding the information supplied by the other, and each indicates to the website that they are willing to accept the match 120.

The website proceeds to notify 122, 124 the first traveler 102 and the second traveler 108 that the match has been accepted. In addition, if requested by either of the travelers, details regarding the trip are sent to other individuals 126, such as a friend, a parent, a spouse, and such like.

FIG. 2A presents a website screen from a preferred embodiment that is used by a traveler to register with the website and to supply identifying and other personal information. The screen includes a personal information section 200 that includes fields 202 for supplying name, address, telephone, date of birth, gender, and driver's license information. The screen also includes a section 204 that includes fields 206 where a student can supply student information, and a security section 208 where a user id and email address are entered 210. In some preferred embodiments the traveler is also required to make one or more payments. This step provides assurance that the information is legitimate and belongs to the traveler or at least someone associated with the traveler.

The registration process continues on a second screen of the same preferred embodiment, illustrated in FIG. 2B. A password section 212 includes fields 214 for supplying a password and a "secret question" and a corresponding answer to be used in the event that the traveler forgets his or her password. The screen also includes a vehicle information section 216 where the traveler can supply information 218 relating to vehicles that can be used for posted trips, such as an automobile make, model, registration number, and such like. A section for indicating types of vehicles 220 is also included. Each time a different vehicle type is selected 222, a different set of vehicle information fields 218 is presented, thereby allowing a traveler to supply information about multiple vehicles.

FIG. 3A, FIG. 3B, and FIG. 3C present website screens from a preferred embodiment that are used by a traveler to provide information regarding a trip being posted by the traveler. The screen illustrated in FIG. 3A includes a departure date and time section 300 and a section where information is provided regarding the number of riders 302 that can be accommodated and the departure and arrival regions 304. A field is also provided 306 where the traveler can indicate details regarding how the expenses of the trip should be shared, and a checkbox 308 can be selected to automatically display a similar screen with the departure and arrival regions reversed, so as to facilitate posting a return trip. The process continues on the screen shown in FIG. 3B, which includes sections regarding the posting traveler's driver's license information 310, as well as ride sharing preferences such as who will drive 312, smoking preferences 314, and the desired gender(s) 316 of the other riders. FIG. 3C includes a field 318 where other, custom ridesharing preferences and requirements can be provided, as well as a section 320 where vehicle information is supplied.

FIG. 4 presents a preferred embodiment website screen that is used by a traveler to provide information regarding a trip that the traveler wishes to make by riding in someone else's vehicle. The screen accepts information regarding when the traveler wishes to depart 400 and how flexible the traveler can be regarding the departure date, as well as the departure area 402 and arrival area 404 and ride sharing gender preferences 406. Similar screens accept information regarding other ride sharing preferences, such as smoking, music, allergies, and such like.

In preferred embodiments, once a traveler has logged into the website and supplied information regarding a desire to share a ride, including ride sharing preferences, a search is initiated and a report of possible ride sharing matches is generated. An example from a preferred embodiment is illustrated in FIG. 5. Rows in the report represent individual ride sharing matches, and columns in the report indicate the departure 500 and destination 502 cities, the date of the ride 504, the ride sharing gender preference 506, as well as hypertext links that can be activated to display more details 508 and preferences regarding a potential ridesharing partner, and to accept a ridesharing match 510. In some preferred embodiments, if the number of identified ride sharing matches is not sufficient, for example if at least 10 potential ride sharing matches are not found, the radii around the departure location and/or the arrival location are enlarged until a specified minimum number of matches is found.

In some preferred embodiments, once a ride sharing match has been accepted a set of ride sharing suggestions is supplied to each traveler included in the match. In various preferred embodiments, the ride sharing suggestions provide advice as to how to make the ride go smoothly and how to avoid any potential hazards associated with sharing a ride with strangers. An example from a preferred embodiment follows:

On the Day of the Ride:
1. Each rider, and the rider with the vehicle, should wait at least fifteen minutes at any pick-up spot. After fifteen minutes, they do not have to wait any longer.
2. Try your best to call the other riders if you expect to be more than five minutes late, so they know that you are still coming.
3. The rider with the vehicle and the other authorized riders should make sure that no other person rides with them because this can raise safety and security concerns. The rider with the vehicle, as the vehicle owner (or as the one given control over the vehicle), should not let unauthorized persons participate in the ride. Letting others participate would be unfair to the authorized riders and will result in a substantial downgrading of your rating. Any others who attempt to participate in the ride should be told that they cannot participate and should be left behind.
4. If any other person not covered by a Confirmation is allowed to participate in the trip, then each rider should seriously consider skipping the ride. This should not happen in most cases, but it could happen. If it does happen, we cannot give you any assurance about the identity of the other traveler, and therefore we cannot give you any assurance about your safety or security. If it does happen, and you opt to cancel, you will receive a credit. You should go to our website and then click on Contact Us, then Complaint, and then click on DOR Rider Discrepancy. You will then be prompted for more information.
5. If the person with the vehicle—i.e., the trip poster—does not appear, but someone else does and offers the same ride, you should not get into the vehicle. You should not take the ride. You should go to our website and then click on Contact Us, then send us an email (Please include the TripID, which you can find in the Ride Details).

Figure 6:
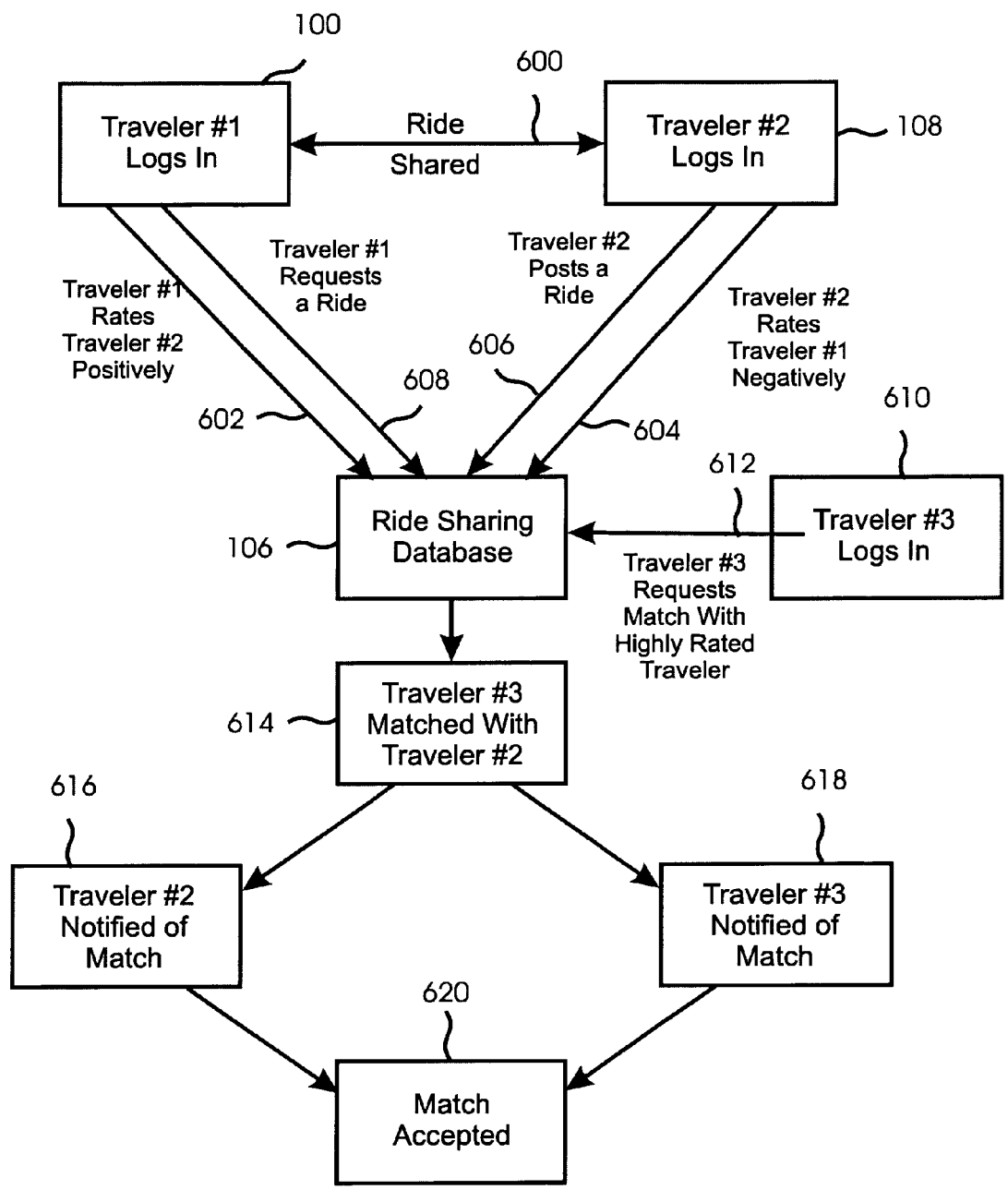
FIG. 6 illustrates a preferred embodiment in which ratings provided by travelers regarding other travelers with whom they have shared rides are considered when seeking ride sharing matches.

FIG. 6 illustrates a preferred embodiment in which ratings provided by travelers regarding other travelers with whom they have shared rides are considered when seeking ride sharing matches. Having already shared a ride 600, the first traveler 100 rates 602 the second traveler 108 positively as a ride sharing companion. On the other hand, the second traveler 108 rates 604 the first traveler 100 negatively as a ride sharing companion. These ratings are reported to the ride sharing database 106. The second traveler 108 then posts 606 a ride, and the first traveler 100 requests 608 a similar ride. However, a search in the ride sharing database does not result in a match between the first traveler 100 and the second traveler 108, because the second traveler has included in his preferences that he (or she) does not wish to be matched with other travelers who have received negative ratings. A third traveler 610 subsequently logs onto the website and requests 612 a ride, also indicating as a preference that he or she does not wish to be matched with someone who has received a negative rating. This request 612 triggers another search of the ride sharing database 106, and this time a match is identified 614 between the second traveler 108 and the third traveler 610. As a result, the second traveler 108 and the third traveler 610 are informed 616, 618 of the match, and the match is accepted 620 by both of them. In this preferred embodiment, a search for matches is triggered each time a new ride posting or ride request is received. In other preferred embodiments, searches are carried out and matches are reported at regular intervals, such as daily or hourly.

FIG. 7A and FIG. 7B present website screens from a preferred embodiment that can be used by a traveler to rate other riders with whom the traveler has previously shared rides. The screen in FIG. 7A applies with regard to rides that were posted by the traveler, and FIG. 7B applies for rides that were shared by the traveler but not posted by the traveler. The screens present information in tables, with rows that represent shared rides and columns that include the departure city 700, the arrival city 702, and the date of the ride 704. Hypertext fields are provided in the last two columns that can be activated to display more details concerning a ride 706 and to display a separate page that can be used to supply rating information concerning riders who participated in the ride 708.

Figure 8:
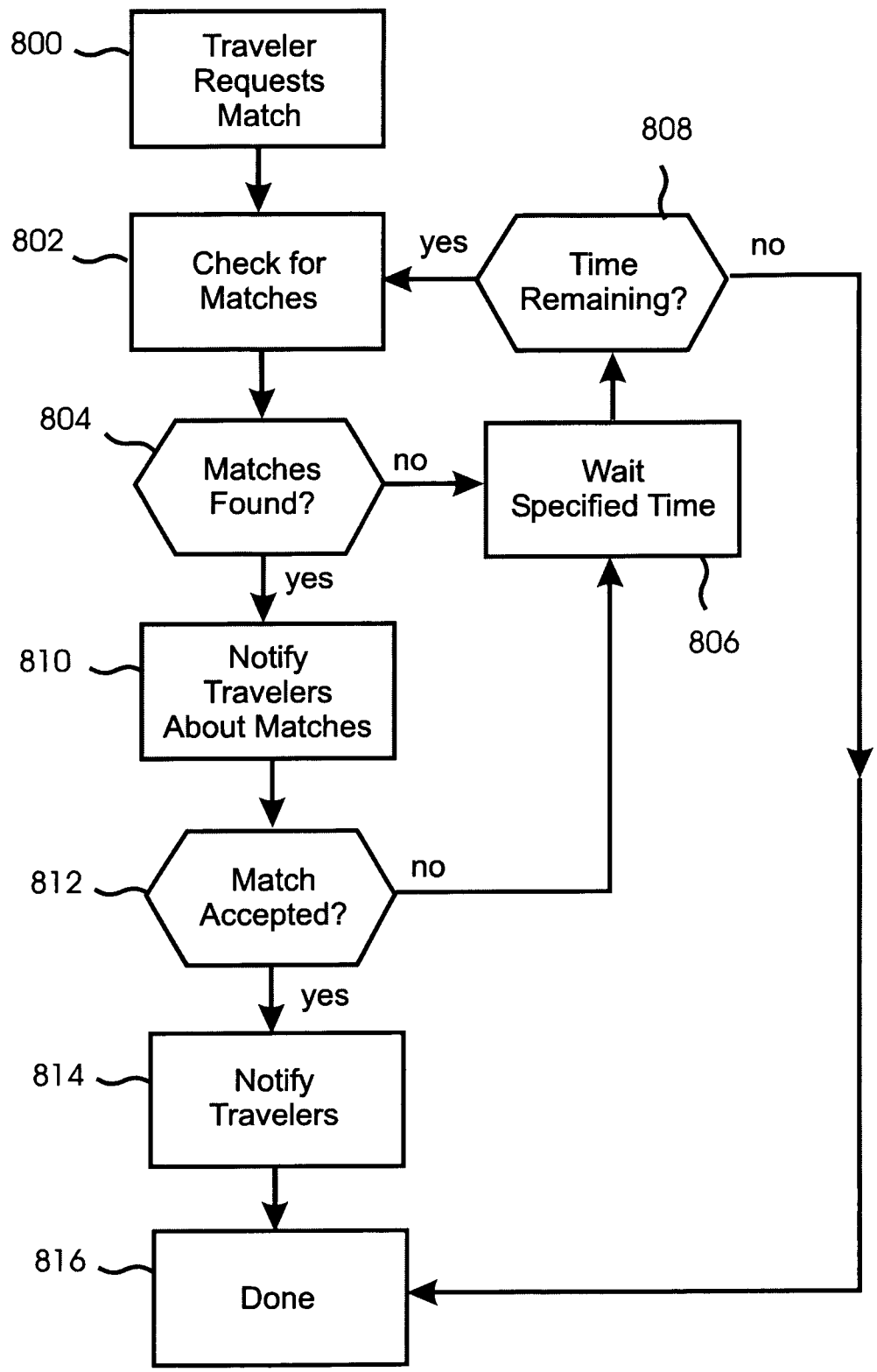
FIG. 8 illustrates a preferred embodiment in which searches for ride sharing matches that do not immediately result in an accepted match are repeated after a specified amount of time, such as a day or an hour.

FIG. 8 illustrates a preferred embodiment in which searches for ride sharing matches that do not immediately result in an accepted match are repeated after a specified amount of time, such as a day or an hour. When a traveler requests a match 800 (or posts a ride), a search 802 is made of the ride sharing database 100 to see if any matches are found 804. If not, a specified amount of time elapses 806, and then if the time for the ride has not passed 808 the search 802 is repeated. If a match is found 804, the travelers involved in the match are notified 810, and if the match is accepted 812 then the process is complete 814. However, if the match is not accepted 812, then the cycle of waiting for a specified time 806 and repeating the search 802 continues until either a match is accepted 812 or time runs out 808.

Figure 9:
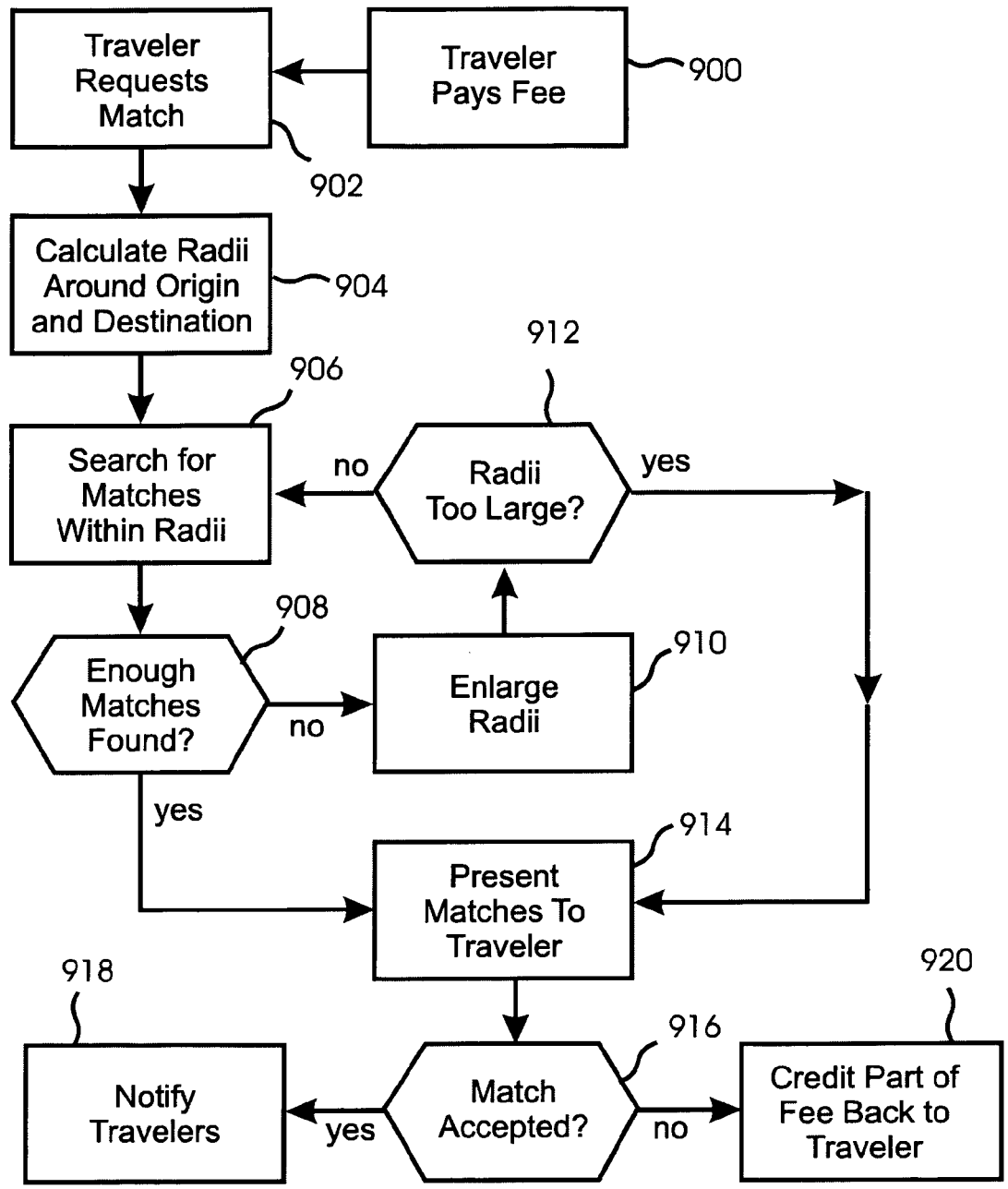
FIG. 9 illustrates a preferred embodiment in which a fee is charged for use of the method, radii are calculated about the specified origin and destination locations for a trip, and the radii are enlarged if an insufficient number of ride sharing matches are found.

FIG. 9 illustrates a preferred embodiment in which a fee is charged for use of the method, radii are calculated about the specified origin and destination locations for a trip, and the radii are enlarged if an insufficient number of ride sharing matches are found. The traveler begins by paying a fee 900, either on a periodic basis or on usage basis, so as to use the method. The traveler then requests a ride sharing match 902 for sharing a ride from a specific origin to a specific destination. According to standard parameters and/or preferences supplied by the traveler, radii are the calculated 904 about the specified origin and destination, and a search is made 906 for matches within the radii. If a sufficient number of matches is not found 908 according to standard parameters and/or preferences supplied by the traveler, the radii surrounding the origin and/or the destination are enlarged 910, and if the radii are not too large 912 the search is repeated 906. If a sufficient number of matches is found 908 or if the radii become too large 912 then the travelers included in the matches that were found 914, if any. If a match is accepted 916, the travelers included in the match are informed 918. If no match is accepted 916, at least part of the fee is credited back to the traveler 920.

Figure 10:
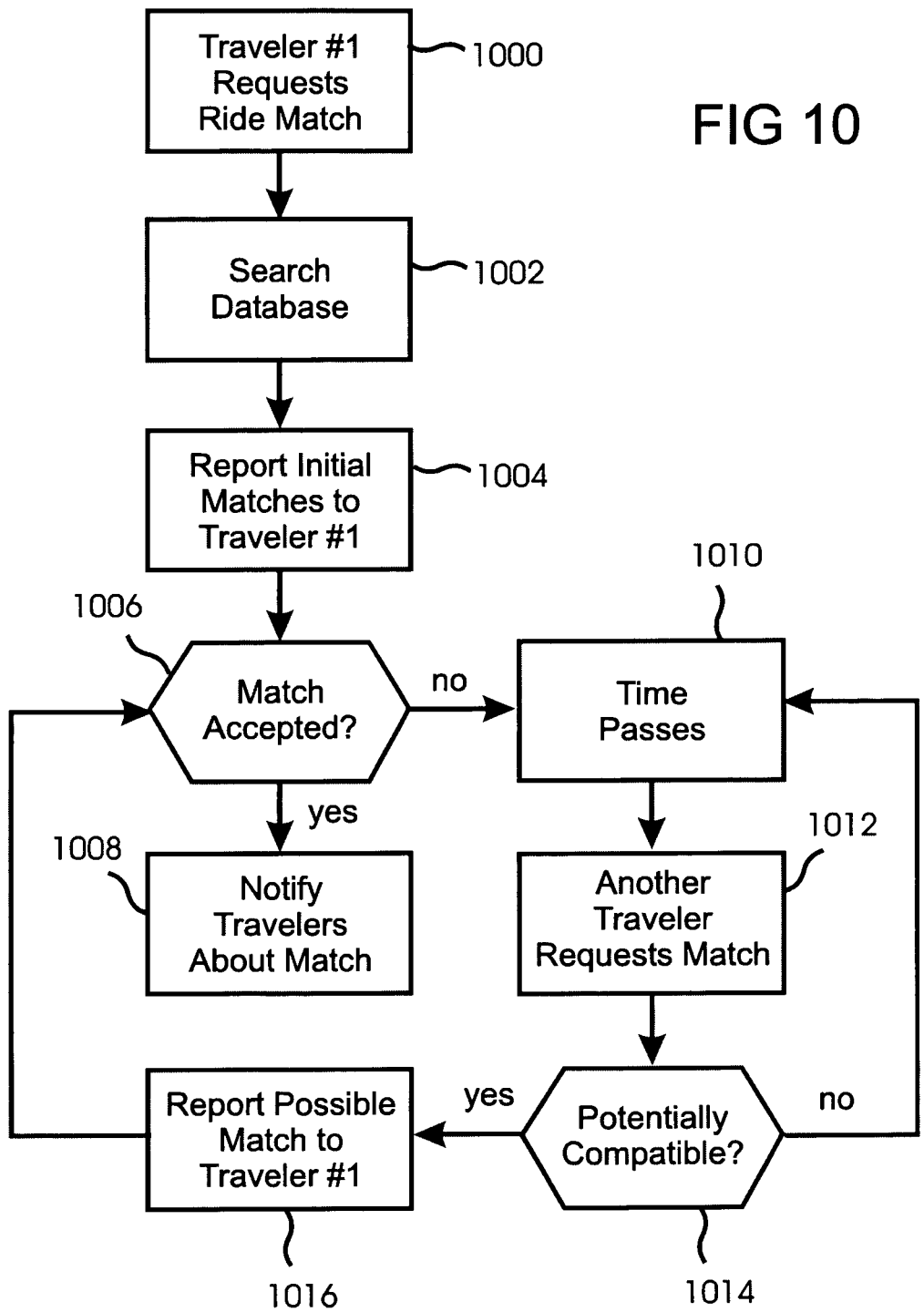
FIG. 10 illustrates a preferred embodiment in which a traveler who has requested a ride sharing match is alerted each time another traveler submits a potentially compatible ride sharing request.

FIG. 10 illustrates a preferred embodiment in which a traveler who has requested a ride sharing match is alerted each time another traveler submits a potentially compatible ride sharing request. When a traveler first requests a ride sharing match 1000, a search is made 1002 of the ride sharing database and an initial report of matches is presented to the traveler 1004. If one of the matches is accepted by all involved travelers 1006, then the travelers are notified of the match 1008 and they proceed to make plans for the shared ride. However, if none of the initial matches is accepted 1006, then as time passes 1010 and new requests for ride share matches are received 1012, each new ride share request is checked to see if it is potentially compatible with the traveler's request 1014, and if so it is reported to the traveler 1016 and the traveler considers whether to accept it or not 1006. This process is continued until either a match is accepted or the time for the ride passes without a match being found.

Other modifications and implementations will occur to those skilled in the art without departing from the spirit and the scope of the invention as claimed. Accordingly, the above description is not intended to limit the invention except as indicated in the following claims.

What is claimed is:

1. A method for facilitating ride-sharing transactions between a first plurality of travelers and a second plurality of travelers, the method comprising:

storing in a database trip information and personal preference information received from each of the first plurality of travelers, each of the first plurality of travelers offering a ride on a trip he or she is planning to take using a vehicle he or she is providing in exchange for an agreement to directly share the expenses of the trip, the received trip and personal preference information being uniquely associated with the planned trip for which the ride is being offered, the personal preference information for each offered ride including terms specified by each of the first plurality of travelers to govern how the expenses will be shared directly between travelers sharing that ride, the received trip information for each offered ride specifying a point of origin and a point of destination for the planned trip and information regarding the vehicle to be provided;

storing in a database trip information and personal preference information received from each of the second plurality of travelers, each of the second plurality of travelers requesting to share a ride for a desired trip in exchange for accepting the terms specifying the manner in which the expenses for the trip will be shared, the received trip and personal preference information uniquely associated with the desired trip for which the ride is being requested, the received trip information for each requested ride specifying a desired point of origin and a desired point of destination;

identifying ride-sharing matches between the rides offered by the first plurality of travelers and the rides requested by the second plurality of travelers, said identifying comprising:
  comparing the stored trip information and the personal preference information associated with each of the offered rides with the stored trip information and personal preference information associated with each of the requested rides; and
  determining the ride-sharing matches based on reaching a predetermined threshold of matching criteria, the matching criteria including a threshold of proximity between the point of origin of an offered ride and the point of desired origin of a requested ride, a threshold of proximity between the point of destination of an offered ride and the point of desired destination of a requested ride, and a match between at least one personal preference specified by the personal preference information for the offered ride and the requested ride;
notifying each one of the second plurality of travelers of any identified ride-sharing matches for the ride he or she has requested, said notifying further comprising providing the trip information and personal preference information associated with the offered ride of each of the identified ride-sharing matches; and
receiving acceptances from the second plurality of travelers of the offered rides, including the terms specifying how expenses will be shared, of one of their notified ride-sharing matches, and for each of the received acceptances: informing the one of the first plurality of travelers that their offered ride, as well as the terms associated with the accepted ride-sharing match has been accepted.

2. The method of claim 1 further comprising:
receiving acceptances from the first plurality of travelers of the requested rides of at least one of their notified ride-sharing matches, and for each of the received acceptances: informing the one of the second plurality of travelers that their requested ride associated with the accepted ride-sharing match has been accepted.

3. The method of claim 2 wherein:
personal and identifying information for each of the first plurality of travelers and each of the second plurality of travelers is stored in the database as part of a registration process prior to storing trip information received therefrom;
said informing each one of the first plurality of travelers of the acceptance of any identified ride-sharing matches for the ride he or she has offered further comprises providing the identifying information associated with the one of the second plurality of travelers having requested the ride of each of the identified ride-sharing matches; and
said informing each one of the second plurality of travelers of the acceptance of any identified ride-sharing matches for the ride he or she has requested further comprises providing the trip identifying information associated with the one of the first plurality of travelers having offered the ride of each of the identified ride-sharing matches.

4. The method of claim 2 further comprising providing suggestions regarding practical issues of ride sharing to all of the travelers who have accepted one of the identified ride sharing matches.

5. The method of claim 2 further comprising providing information regarding the accepted ride-sharing match to a third party upon request of one of the first or second plurality of travelers who has accepted the identified ride-sharing match.

6. The method of claim 2 further comprising sending reminders to those of the first and second plurality of travelers who have accepted one of the identified ride-sharing matches, the reminders being sent at predetermined intervals of time in advance of an agreed upon date of departure and time of departure for the planned trip.

7. The method of claim 1 wherein said identifying ride-sharing matches is performed iteratively with the threshold of proximity between at least one of: the point of origin and the desired point of origin, the point of destination and the point of desired destination being relaxed in a predetermined manner each time performed until either a predetermined number of ride-sharing matches is identified for each offered ride and for each requested ride, or a predetermined limit placed on relaxing the threshold has been reached.

8. The method of claim 7 wherein the identified ride-sharing matches include two or more different offered rides that in combination will result in a departure from the desired point of departure within the predetermined limit of the threshold of proximity and an arrival at the desired point of arrival within the predetermined limit of the threshold of proximity.

9. The method of claim 1 wherein:
the points of origin, destination, desired origin and desired destination are specified by a region;
the threshold of proximity is met for the points of origin and desired origin when they fall within the same region; and
the threshold of proximity is met for the points of destination and desired destination when they fall within the same region.

10. The method of claim 9 wherein the region is specified by a zip code.

11. The method of claim 9 wherein the region is specified as a radial distance drawn from each of the points, and the threshold of proximity is met when the regions overlap.

12. The method of claim 1 wherein the matching criteria further include a threshold of date compatibility.

13. The method of claim 12 wherein:
the received trip information associated with each offered ride specifies an acceptable range of dates for a date of departure from the point of origin and a range of acceptable dates for a date of arrival at the point of destination;
the received trip information associated with each requested ride specifies a range of acceptable dates for a desired date of departure from the desired point of origin and a range of acceptable dates for a desired date of arrival at the desired point of destination; and
whereby the threshold of date compatibility is met at least when the specified range of dates for the date of departure and the desired date of departure overlap, or the specified range of dates for the date of arrival and the desired date of arrival overlap.

14. The method of claim 13 wherein a ride-sharing match is identified between an offered ride and a requested ride at least when the proximity threshold between the points of departure and desired departure is met, the proximity threshold between the points of destination and desired destination is met, the threshold of date compatibility is met, and a predetermined threshold percentage of the personal preference information specified for the offered ride and requested ride matches.

15. The method of claim 14 wherein the step of identifying ride-sharing matches is performed on a periodic basis for each requested ride until an identified ride-sharing match including the requested ride has been mutually accepted by the one of the second plurality of travelers requesting the ride and the one of the first plurality of travelers who is offering the ride of the identified ride-sharing match.

16. The method of claim 14 wherein the step of identifying ride-sharing matches is performed periodically for each offered ride until either a predetermined maximum number of identified ride-sharing matches for the requested ride have been mutually accepted by the one of the first plurality of travelers requesting the ride and the one of the second plurality of travelers who is offering the ride for each of the predetermined number of identified ride-sharing matches, or the specified range of dates specified for the planned trip the offered ride has passed.

17. The method of claim 16 wherein the trip information associated with each offered ride specifies the predetermined maximum number of ride-sharing matches that can be mutually accepted for the planned trip.

18. The method of claim 14 wherein said identifying ride-sharing matches is performed iteratively with at least one of the proximity threshold between the points of origin and desired origin, the proximity threshold between the points of destination and desired destination, the ranges of dates around the dates of departure and desired departure, the ranges of dates around the dates of arrival and desired arrival, and the predetermined threshold of the personal preference information specified for the offered ride and requested ride being relaxed in a predetermined manner each time said identifying ride-sharing matches is performed until either a predetermined number of ride-sharing matches is identified for each requested ride, or until a predetermined limit of relaxation has been reached for each of the thresholds.

19. The method of claim 1 wherein:
the personal preference information received from each of the first plurality of travelers further comprises whether each of the first plurality of travelers prefers that the driving be shared by any of the second plurality of travelers accepting the offered ride.

20. The method of claim 19 wherein:
the personal preference information specified for the requested ride includes whether the traveler requesting the ride is available to perform at least a portion of the driving; and
personal and identifying information including a driver's license number and a driver's license state of issue.

21. The method of claim 1 wherein:
the trip information associated with each offered ride further includes descriptive and identifying information for the vehicle to be used for the planned trip; and
the personal preference information specified for the requested ride includes a preference for the type of vehicle to be used for requested ride.

22. The method of claim 21 wherein the descriptive and identifying information for the vehicle to be used for the planned trip includes at least one of: a vehicle type, a vehicle make, a vehicle model, a vehicle year of manufacture, vehicle licensing information, a vehicle registration, a vehicle owner name, a vehicle color, and a description of vehicle condition.

23. The method of claim 1 wherein the personal preference information includes at least one of: an expense sharing preference, a gender preference, a departure time preference, a pick up location preference, a drop off location preference, a music preference, an allergy avoidance preference, a preference for accommodating disabilities, a preference for driving, a pet related preference, and a preference for accommodating special needs.

24. The method of claim 1 further comprising:
receiving and storing in the database rating information submitted by one or more of the second plurality of travelers, the rating information providing a rating of an experience each of the one or more of the second plurality of travelers had sharing a ride with one of the first plurality of travelers;
wherein said identifying ride sharing matches further comprises comparing a rating preference included in the personal preference information specified for the requested ride with any rating information associated with the one of the first plurality of travelers offering a ride; and
wherein the matching criteria for said identifying further includes a threshold of matching between the specified rating preference and the rating information for the one of the first plurality of travelers offering the ride.

* * * * *